(12) United States Patent
Korst et al.

(10) Patent No.: US 10,028,030 B2
(45) Date of Patent: Jul. 17, 2018

(54) APPARATUS AND METHOD FOR MANAGING A PERSONAL CHANNEL

(75) Inventors: Jan Korst, Eindhoven (NL); Mauro Barbieri, Eindhoven (NL); Serverius Petrus Paulus Pronk, Vught (NL)

(73) Assignee: Funke Digital TV Guide GmbH, Berlin (DE)

( * ) Notice: Subject to any disclaimer, the term of this patent is extended or adjusted under 35 U.S.C. 154(b) by 46 days.

(21) Appl. No.: 14/007,363

(22) PCT Filed: Apr. 30, 2012

(86) PCT No.: PCT/EP2012/057883
§ 371 (c)(1),
(2), (4) Date: Sep. 25, 2013

(87) PCT Pub. No.: WO2012/146775
PCT Pub. Date: Nov. 1, 2012

(65) Prior Publication Data
US 2014/0020027 A1 Jan. 16, 2014

(30) Foreign Application Priority Data
Apr. 28, 2011 (EP) .................................... 11164175

(51) Int. Cl.
*H04N 21/482* (2011.01)
*H04N 21/258* (2011.01)
(Continued)

(52) U.S. Cl.
CPC ........... *H04N 21/482* (2013.01); *H04N 21/25* (2013.01); *H04N 21/251* (2013.01);
(Continued)

(58) Field of Classification Search
None
See application file for complete search history.

(56) References Cited

U.S. PATENT DOCUMENTS 5,758,257 A * 5/1998 Herz et al. .................... 725/116
7,315,881 B2 * 1/2008 Menez .......................... 709/206
(Continued)

FOREIGN PATENT DOCUMENTS

| RU | 2301503 | 6/2007 |
| RU | 2361370 | 7/2009 |
| WO | 2007063468 A1 | 6/2007 |
| WO | 20070072368 A1 | 6/2007 |

OTHER PUBLICATIONS

Pronk, et al; "Incorporating Confidence in a Naive Bayesian Classifier;" Lecture Notes in Artificial Intelligence 3538: Proceedings of the Tenth International Conference on User Modeling, Edinburgh, UK; 2005; pp. 317-326.
(Continued)

*Primary Examiner* — Justin Shepard
(74) *Attorney, Agent, or Firm* — Ware, Fressola, Maguire & Barber LLP

(57) ABSTRACT

The present invention relates to an apparatus (100), a video system, a method and a corresponding computer program and a computer readable medium for managing a personal channel (210) of a user (200). The apparatus (100) is configured to identify a personal channel data piece that specifies a content item that the user (200) of the personal channel might not like anymore. The apparatus (100) then suggests (142) to the user (200) to delete the corresponding identified personal channel data piece and thus assists the user (200) in keeping a clear personal channel (210).

10 Claims, 3 Drawing Sheets

(51) Int. Cl.
*H04N 21/266* (2011.01)
*H04N 21/25* (2011.01)
*H04N 21/2668* (2011.01)
*H04N 21/458* (2011.01)
*H04N 21/466* (2011.01)
*H04N 21/442* (2011.01)
*H04N 21/45* (2011.01)
*H04N 21/475* (2011.01)
*H04N 21/84* (2011.01)
*H04N 5/445* (2011.01)

(52) U.S. Cl.
CPC ..... *H04N 21/258* (2013.01); *H04N 21/25808* (2013.01); *H04N 21/25891* (2013.01); *H04N 21/266* (2013.01); *H04N 21/2668* (2013.01); *H04N 21/44222* (2013.01); *H04N 21/458* (2013.01); *H04N 21/4532* (2013.01); *H04N 21/4667* (2013.01); *H04N 21/4668* (2013.01); *H04N 21/4755* (2013.01); *H04N 21/4826* (2013.01); *H04N 21/84* (2013.01); *H04N 2005/44569* (2013.01)

(56) References Cited

U.S. PATENT DOCUMENTS

| | | |
|---|---|---|
| 2004/0216156 A1 | 10/2004 | Wagner |
| 2006/0129547 A1* | 6/2006 | Yamamoto ........... H04N 21/482 |
| 2008/0271080 A1* | 10/2008 | Gossweiler ........... G06F 3/0486 725/47 |
| 2009/0013002 A1* | 1/2009 | Eggink ............. G06F 17/30702 |
| 2009/0199226 A1* | 8/2009 | Suehiro et al. .................. 725/9 |
| 2010/0050211 A1 | 2/2010 | Seldin et al. |
| 2010/0217613 A1* | 8/2010 | Kelly ............................ 705/1.1 |
| 2010/0251304 A1 | 9/2010 | Donoghue et al. |
| 2010/0251305 A1 | 9/2010 | Kimble et al. |
| 2011/0067047 A1* | 3/2011 | Karaoguz et al. .............. 725/14 |

OTHER PUBLICATIONS

Cremonesi, P. and Turrin, R., "Time-evolution of IPTV recommender systems," EuroITV 2010 Proceedings of the 8th International Interactive Conference on Interactive TV & Video, pp. 105-114.

\* cited by examiner

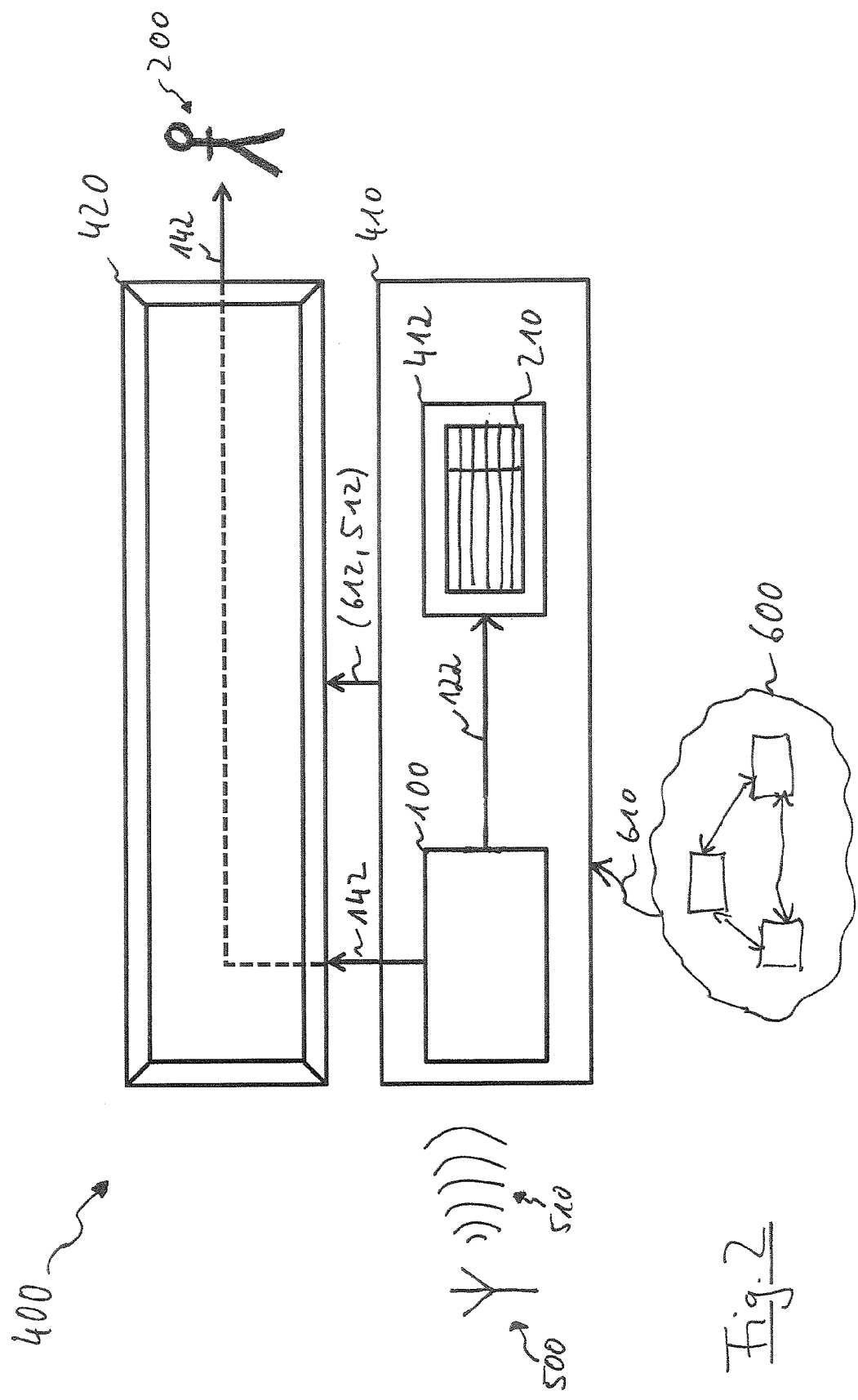

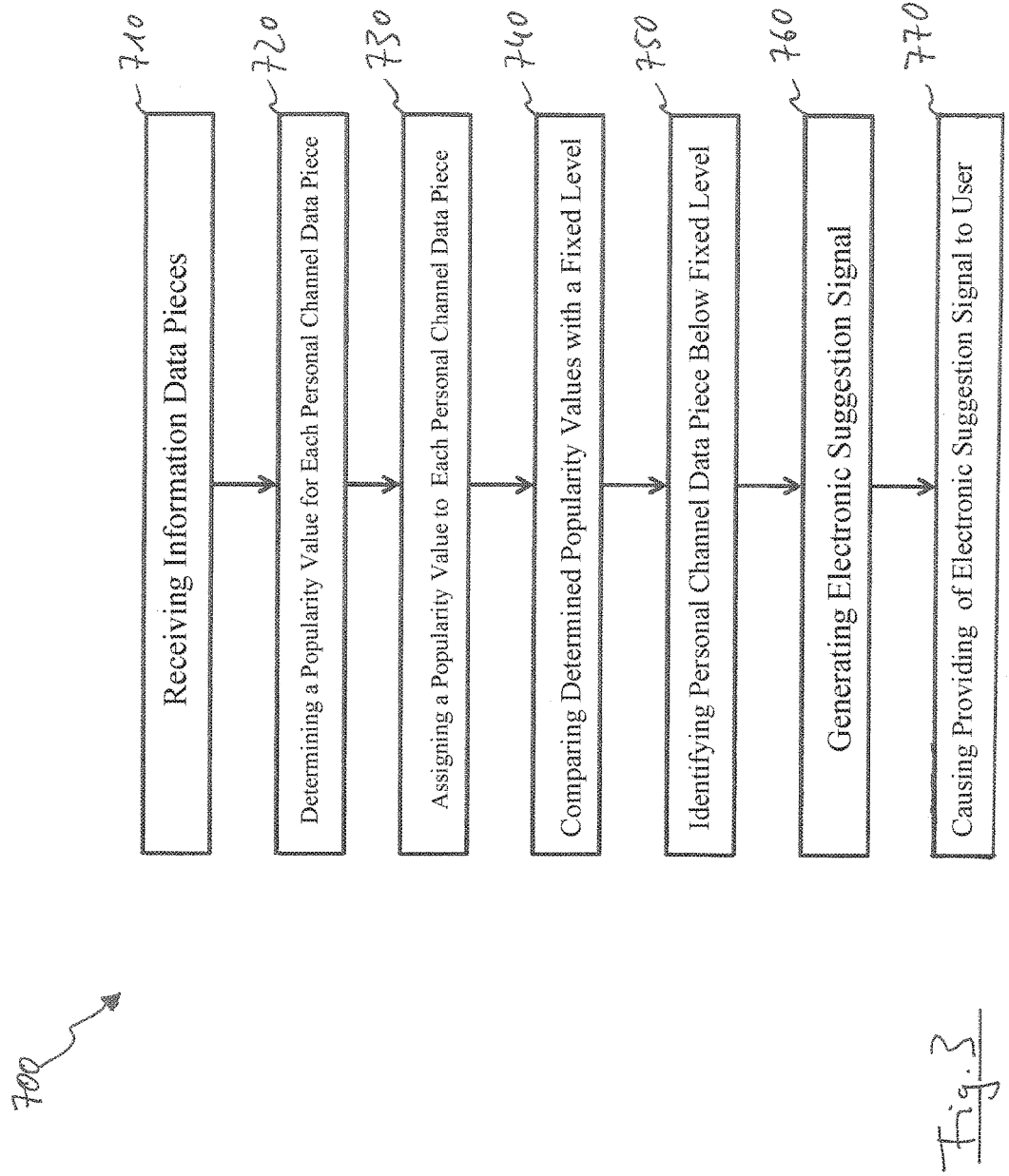

APPARATUS AND METHOD FOR MANAGING A PERSONAL CHANNEL

CROSS REFERENCE TO RELATED APPLICATIONS

This application is the U.S. National Stage of International Application Number PCT/EP2012/057883 filed on Apr. 30, 2012 which in turn claims priority under 35 USC § 119 to European Patent Application No. 11164175.9 filed on Apr. 28, 2011, which applications are hereby incorporated by reference in their entirety.

FIELD OF INVENTION

The present invention relates to an apparatus for managing a personal channel of a user, a method for managing a personal channel of a user, a video system with such apparatus, a corresponding computer-readable medium and a corresponding computer program. In particular, the present invention relates to an apparatus and a method for a semi-automatic management of a personal channel.

BACKGROUND OF THE INVENTION

A personal channel of a user is stored in a memory and contains personal channel data that provide information about linear and/or non-linear content items which the user likes or dislikes. For instance, a group of certain television (TV) programs are bundled into a personal channel. Instead of zapping through all available broadcast programs/channels, the user can zap through his personal channels. For instance, a user has set up a personal news channel, a personal cartoon channel and/or a personal movie channel. Due to the fact that the amount of available content items continues to increase, such a personal channel becomes an increasingly important tool to a user, as it offers him the possibility to quickly find a content item of interest.

A personal channel has a specification, for instance in terms of a number of manually added "seed" content items or of a Boolean expression consisting of a number of disjuncts, which can define what content items may be automatically added to the personal channel. A personal channel further has a set of received or (to be) recorded content items that are received/recorded according to the "seed" content items or, respectively, according to the Boolean expression. The user can zap through the received/recorded content items, wherein a recorded item is usually stored on a hard disk operatively connected to the personal channel. In particular, the concept of personal channels allows one or more users of a recorder, e.g. employing hard-disk technology, to independently define to a plurality of channels, which are similar to existing broadcast channels, but which are typically filled with recorded broadcast content, downloaded internet content, or links to downloadable or streamable internet content. Such a personal channel is personalized, not only due to the fact that the user creates his own personal channel, but also by the fact that such a personal channel may be equipped with a recommender. This recommender learns the taste of the user of the channel by user feedback, either explicitly or implicitly, and serves to fine-tune the content of the channel.

Creating a personal channel is, for instance, done by a user by simply choosing a channel/program from the electronic program guide (EPG) and indicating that he wants to create a new personal channel with this program. This initial channel/program serves as a seed, and more, similar channels/programs will be selected and/or recommended for adding to the personal channel. There are thus several possibilities of how a personal channel can grow: The user may add a new content item manually, the user may add a new content item upon recommendation of a recommender system, or a personal channel manager automatically adds a new content item to the personal channel that is similar to content items already existent in the personal channel that is to say: which matches to the manually added content items.

A linear content item is, for instance, a broadcasted TV program or a broadcasted radio program. In contrast to a non-linear content item, a user cannot control the linear content item during broadcasting. However, he may record a linear content item to watch it at a later time. A non-linear content item, for instance a video content, is available from a content item source like a computer-implemented network, such as the internet or a local area network, or from a computer-implemented server. A user can choose, which non-linear content item he wants to see and can control play back of the chosen non-linear content item. Thus, the term non-linear content is used to indicate video content that is not distributed via broadcasting but via other means, usually via internet streaming or download.

A personal channel is specified by personal channel data. For instance, a personal channel data piece can be a Boolean expression as the above named conjunct of disjuncts or metadata according to one or more "seed" content items. Personal channel data can specify a content item type, for instance by specifying a main actor, a title, a genre and/or significant persons and so forth. Usually, personal channel data is present in the form of linked character strings.

As a user may add more and more content items to his personal channel, such a personal channel typically grows over time in terms of manually added content items.

SUMMARY OF THE INVENTION

It is an object of the present invention to provide an apparatus that assists the user in managing his personal channel. It is furthermore an object of the present invention to provide a method that assists the user in managing his personal channel, a corresponding computer program and a corresponding computer readable medium. In addition, it is also an object of the present invention to provide a user friendly video system having such apparatus.

According to a first aspect of the present invention, this object is achieved by providing an apparatus for managing a personal channel of a user containing a number of personal channel data pieces, each of the number of personal channel data pieces specifying at least one content item type, wherein the apparatus has:
  an input for receiving information data pieces provided by a content item information source, wherein each of the information data pieces specifies a content item,
  a popularity value determiner coupled to the input and the personal channel and configured
    to determine for each personal channel data piece a popularity value in dependence of a number of the information data pieces that are associable to the at least one content item type of a respective personal channel data piece and
    to assign a respective determined popularity value to each of the personal channel data pieces of the personal channel,
  a comparator configured to compare the determined popularity values of the personal channel data pieces with a fixed level and identify such a personal channel data piece, whose assigned popularity value is below the fixed level and a signal generator configured to generate an electronic suggestion signal in dependence of the identified personal channel data piece and to cause providing of the electronic suggestion signal to the user, the electronic suggestion signal indicating to the user to exclude the identified personal channel data piece from his personal channel.

The present invention includes the recognition that a personal channel that has grown and thus contains a large amount of personal channel data pieces, which together may specify a large amount of content item types and/or content items, leads to the problem of managing such a grown channel. Maybe over time, the user's taste has changed and the personal channel data pieces of the personal channel do not reflect that changed taste of the user anymore. Furthermore, the user of the grown personal channel might have lost the overview of the set-up of his grown personal channel. However, there has been no simple solution known for cleaning up a grown personal channel.

The apparatus of the first aspect of the present invention automatically assists the user in this non-trivial task of channel management by suggesting an option for reducing the number of personal channel data pieces of the personal channel. The user then decides whether or not he wants to follow the suggestion and to exclude the identified personal channel data piece from his personal channel. As a grown personal channel may disturb the user, the user is likely to indeed follow the suggestion provided automatically to him. The reduced number of personal channel data pieces of the personal channel of the user allows the user to more conveniently zap between the content items specified by the personal channel. Furthermore, the amount of data space required for storing the personal channel data pieces is reduced. In addition, the processing time required to evaluate a complete personal channel filter is reduced. This can save substantial processing power and resources in the case of a server/centralized implementation that has to evaluate thousands of personal channel filters for thousands of users.

Therefore, the apparatus of the first aspect of the present invention forms a semiautomatic approach for managing a personal channel, which automatically causes providing of the electronic suggestion signal to the user, thereby informing the user that the identified personal channel data piece could be excluded from the personal channel and wherein the user controls the last step of actually deleting the identified personal channel data piece from his personal channel.

The popularity value determiner determines for each personal channel data piece contained in the personal channel a popularity value and assigns a respective determined popularity value to each of the personal channel data pieces. For instance, the popularity value determiner calculates a respective popularity value by checking, how many of the provided information data pieces are associable to the at least one content item type for respective personal channel data piece. The more information data pieces, that is to say: the more content items are associable to a respective personal channel data piece, that is to say: to the at least one content item type, the higher the popularity value for that respective personal channel data piece. Correspondingly, if the number of information data pieces that is associable to another personal data piece is comparatively low, the assigned popularity value of that other personal channel data piece is low as well.

Each personal channel data piece of the personal channel specifies at least one content item type. Thus, a personal channel data piece can, for instance, specify a certain TV program, a certain linear content item, such as a movie, broadcasted by a TV station, a certain non-linear content item, being available on the internet, a content item group of a specific type, such as videos of interviews with a certain person provided by a specific content item source and so forth. Therefore, the wording " . . . specifies at least one content item type" is to be understood such that a respective personal channel data piece can specify a certain entire seed content item or only a genre and/or an actor or other information that characterizes one or more content items.

The content item information source delivering information data pieces which specify content items can be, for instance, an electronic program guide (EPG).

The popularity value determiner operates automatically and preferentially regularly assigns a respective determined popularity value to each of the personal channel data pieces of the personal channel. For instance, the popularity value determiner updates the assigned popularity values every week or every month. The comparator of the apparatus identifies such a personal channel data piece whose assigned popularity value is below the fixed level. This means that the comparator, for instance, determines an average of all popularity values and identifies such personal data pieces, whose assigned popularity values are significantly below that average. Or, for instance, the comparator identifies such personal channel data pieces, whose assigned popularity values are the lowest of all popularity values. Also, the fixed level can be a user defined fixed level.

It shall be understood that the popularity value determiner is not only adapted to determine respective popularity values based on the actual value of the number of associable information data pieces, but also, in an embodiment, alternatively or additionally, by taking into account the number and/or duration of user accesses to content items being associable to a respective personal channel data piece of the personal channel. For instance, the popularity value determiner determines respective popularity values by taking into account, how often an associable content item is regarded/listened to by the user, and/or, how many of content items being associable to a certain personal channel data piece are actually regarded/listened to by the user. To give an example: If there are five content items associable to a certain personal channel data piece and the user has actually consumed these five associable content items, the popularity value for the certain personal channel data piece would be high. In particular, this popularity value for the certain personal channel data piece can be higher than a popularity value for another personal channel data piece, to which more than five content items are associable, wherein these more than five associable content items, however, have not been consumed by the user or, respectively, only few of them have been consumed by the user. Thus, in a preferred embodiment of the apparatus, the popularity value determiner is configured to determine the popularity values of the personal channel data pieces by further registering, for each of the number of channel data pieces, a number and/or duration of user accesses to content items that are associable to a respective channel data piece of the personal channel.

In one embodiment, the apparatus is configured to automatically delete the identified personal channel data piece. Thus, this embodiment of the apparatus requires no user interaction to maintain a clear personal channel. In this embodiment, it is preferred when the fixed level is a user defined fixed level.

In a preferred embodiment, the popularity value determiner is configured to determine the popularity values of the personal channel data pieces by calculating for each personal channel data piece a ratio of the number of information data pieces that are associable to the at least one content item type of a respective personal channel data piece and the number of provided information data pieces. For instance, if no information data piece is associable to a personal channel data piece, the popularity value for that personal channel data piece is 0 and therefore the apparatus will cause providing of the electronic to suggestion signal to the user, thereby indicating to him, that this personal channel data piece could be deleted or otherwise excluded from the personal channel.

In a particular preferred embodiment the apparatus additionally comprises a recommender engine coupled to the input and configured to assign a number of respective score values to each of the information data pieces in dependence of each personal channel data piece of the personal channel, such that each of the information data pieces is assigned with a set of score values, wherein each of the set of score values is associated to one of the personal channel data and wherein the popularity value determiner is coupled to the recommender engine and configured to determine the popularity values for each of the personal channel data pieces in dependence of the score values being associated to a respective personal channel data piece.

Therefore, if the recommender engine hardly finds any new content items for recommendation based on a certain personal channel data piece, the popularity value determiner assigns a rather low popularity value to that personal channel and the comparator of the apparatus identifies this personal channel data piece and the signal generator causes providing of the electronic suggestion signal to the user, the electronic suggestion signal indicating to the user to exclude that identified personal channel data piece from its personal channel. Thus, an apparatus with such a recommender engine is very useful, as the recommender engine basically identifies the associable information data pieces to the popularity value determiner. The popularity value determiner therefore does not have to identify such associable information data pieces himself.

It is furthermore preferred that the recommender engine is an adaptive recommender engine that automatically adapts itself in dependence of the actual taste of the user. Such recommender engine is generally known to those skilled in the art, for instance from Pronk, V., Gutta, S. V. R., & Verhaegh, W. F. J.: "Incorporating confidence in a naive Bayesian classifier", in: L. Ardissono, P. Brna, & A. Mitrovic (Eds.), Lecture Notes in Artificial Intelligence 3538: Proceedings of the Tenth International Conference on User Modeling Edinburgh, UK, 317-326, [2005].

In another preferred embodiment, the apparatus additionally comprises a similarity determiner configured to detect at least two of the personal channel data pieces being similar to each other, wherein the signal generator is configured to generate the electronic suggestion signal to the user, such that the electronic suggestion signal indicates to the user to exclude the identified personal channel data piece or a detected similar personal channel data piece being similar to the identified personal channel data piece from his personal channel.

Upon receiving such an electronic suggestion signal, the user can decide whether he simply wants to delete the identified personal channel data piece or the similar personal channel data piece from his personal channel or if he additionally wants to set up a new personal channel with the identified or similar personal channel data pieces.

Usually, one of the personal channel data pieces is present in a form of a logical AND-conjunction of a plurality of logical conditions. If so, the popularity value determiner is preferentially configured to determine the popularity value for the respective personal channel data piece in dependence of a number of information data pieces that meet the logical AND-conjunction of the respective personal channel data piece. Therefore, the popularity value determiner can be implemented as a simple integrated circuit that performs a logical IF-monitoring of which information data pieces are associable to a respective personal channel data piece. The popularity value then corresponds to the number of information data pieces which complied with the IF-condition.

In a preferred embodiment, the apparatus comprises a second input for receiving a user trigger signal, wherein the apparatus is configured to start operating upon receiving the user trigger signal. Therefore, if the user has the impression that a one or more of his personal channels has grown too much or is inconsistent, he can initiate that an electronic suggestion signal is presented to him.

In the following, a specific preferred embodiment of the apparatus of first aspect is described:

The personal channel can be described by a filter and, optionally, by a user profile. The filter can be a Boolean function that operates on linear content items using the EPG data on these linear content items. Typically, the Boolean function takes the form of a disjunction of conjunctions. Each disjunct can correspond to one manually added TV program (in the following, only the wording TV program is used, however, it could also be a radio program or other linear content item), but is more general than the TV program description itself, so that more, similar programs may satisfy that disjunct. For example, the filter of a personal channel labelled "romantic" with two added TV programs (linear content items) can be the following function:

$$\left[(TV\ channel = ''Hallmark'') \wedge (time = ''prime\ time'') \wedge (genre = ''romance'')\right] \quad (1)$$
$$\vee$$
$$\left[(TV\ channel = ''NET\ 5'') \wedge (time = ''prime\ time'') \wedge (genre = ''chick\ flick'')\right]$$

In the context of the description above, one of the personal channel data pieces can be such an AND-conjunction. The specific personal channel described above would therefore contain two personal channel data pieces, which are OR-linked. Therefore, in general, such a filter $F^c$ of a personal channel c can be described by a set of disjuncts $D_i^C$, with i=1, 2 ... $n_c$, as follows:

$$F^c = \bigvee_{i=1}^{n_c} D_i^c. \quad (2)$$

Each disjunct $D_i^C$ typically consists of a conjunction of simple expressions in terms of EPG data, as shown in formula (1).

The optional user profile can be built up based on user feedback on content items and is typically used by the recommender engine to score a new content item, i.e. calculating a value that expresses how much the user of the channel may like the new content item, as explained above.

In this specific embodiment, the apparatus suggests to the user to simplify his personal channel by eliminating a superfluous disjunct (identified personal channel data piece) from the personal channel.

The popularity value determiner of this specific embodiment is configured to analyse each disjunct for its popularity in terms of the relative number of new content items that satisfy this disjunct per unit of time, given EPG data. For instance, the popularity value determiner determines the popularity value of a disjunct $D_i^C$ as follows. Let N (B, E) denote the number of new content items specified by the information data pieces E that satisfy Boolean expression B. Then the popularity value P $(D_i^C, E)$ of disjunct $D_i^C$ given the to information data pieces E can be defined as $$P(D_i^c, E) = \frac{N(D_i^c, E)}{\sum_{j=1}^{n_c} N(D_j^c, E)} \quad (3)$$

The table below provides an example for the N-values of various disjuncts, expressed in terms of channel, time and genre.

| TV Channel | Time | Genre | on next week/ popularity value |
|---|---|---|---|
| RTL 5 | early evening | romance | 0 |
| Net 5 | prime time | drama/romance | 17 |
| SBS 6 | prime time | drama/romance | 8 |
| RTL8 | late night | drama | 9 |
| Hallmark Channel | late night | romance/drama | 1 |

The comparator of this specific embodiment thus identifies, for instance, the first and the last personal channel data pieces/disjuncts. The signal generator causes providing of the electronic suggestion signal to the user, the electronic suggestion signal indicating to the user to exclude the identified personal channel data pieces from his personal channel, in this example channel data pieces related to TV channel "RTL 5" and TV channel "Hallmark Channel".

When determining, the popularity value determiner can be assisted by the recommender engine, if present, which is configured to assess the popularity of a disjunct by scoring content items that satisfy this disjunct, as described above. If the recommender engine is present, the recommender engine assigns a score value r (p) to each information data piece p, that is to say: to each new content item, that satisfies the disjunct. The score value r $(D_i^C, E)$ of disjunct $D_i^C$, relative to all information data pieces E can be defined as the average score of the content items that satisfy the disjunct, which can be expressed as follows:

$$r(D_i^c, E) = \frac{\sum_{p \in E, D_i^c(p)} r(p)}{\sum_{p \in E, D_i^c(p)} 1} \quad (4)$$

Note that the denominator serves as a cardinality operator on the domain. The popularity value determiner can directly use these score values as popularity values and assign them to the disjuncts/personal channel data pieces.

If the specific embodiment is additionally equipped with the similarity determiner, it is furthermore configured to operate as follows: The similarity determiner is configured to determine the similarity and dissimilarity between disjuncts of the personal channel. For instance, the similarity between two disjuncts D and D' can be defined as follows: Suppose S and S' denote two sets of recent content items that were associable to the disjuncts D and D', respectively. Using these two sets, the similarity determiner designs two feature vectors, based on metadata, and assesses the correlation between these two designed feature vectors to determine the similarity between the two disjuncts. The feature vectors are designed as follows:

Each content item of the two sets S and S' can be described by feature-value pairs, such as (genre, "comedy"), (actors, {"Sandra Bullock", "Keanu Reeves"}). Thus, there are two types of feature-value pairs: single-valued and multi-valued pairs. The first example is a single-valued pair, the second a multi-valued pair. Multi-valued feature-value pairs can be split into multiple single-valued feature value pairs.

The similarity determiner of this specific embodiment of the apparatus translates a set S of content items to a feature vector by considering all or a defined subset of possible single-value feature-value pairs (f, v) in a predetermined order and to consider them as component labels of a, potentially large, vector, and storing in each entry (f, v) of the vector associated with S the number of times this pair occurred in the metadata of any of the content items in S. The value of a pair may occur as value in a multi-valued feature-value pair.

The occurrence of multi-valued feature-value pairs may cause some feature values to be over-represented. To compensate for this, the similarity determiner counts the values of a multi-valued feature with m values, for instance 1/m times, or in a different weighted fashion, depending on the order of the values in the metadata. In this way, a series of movies in which a certain actor plays a minor role will not overly emphasize this actor. Alternatively, a starring actor could be emphasized more.

The similarity value determiner uses, e.g., an inner product of the numerical feature to vectors associated to the sets S and S' to define a similarity measure between them. For example, suppose there is a disjunct $D_1$ with genre romance/drama, a disjunct $D_2$ with genre drama/comedy, and a disjunct $D_3$ with genre science fiction. Now, $D_1$ and $D_2$ are not only more similar in nature than $D_3$ in terms of genre, both $D_1$ and $D_2$ will pass most movies with actress Sandra Bullock, whereas $D_3$ will not. Based on this, the signal generator causes providing of the electronic suggestion signal to the user, the electronic signal suggestion him to split his channel into two channels.

This notion of similarity can be generalized by aggregating components of a vector into one, using some correlation between the respective feature-value pairs. This correlation may be based on, for example, the number of co-occurrences of pairs of values on the Internet, relative to the number of occurrences of each value separately. In this way, clusters of feature-value pairs can be formed. These clusters then act as single component labels and the individual counts may be added together or otherwise combined.

The clusters of feature-values that are responsible for the correlation can be used to provide an explanation to the user. These values can also be used to suggest a name for a new personal channel by zooming in on the largest contributions to the correlation.

According to a second aspect of the present invention, a video system having a receiver and a display, the receiver being configured to receive a linear content item provided by a broadcasting station and/or to receive a non-linear content item provided by a computer implemented network and the display being configured to display the received linear content item and/or the received non-linear content item, wherein the receiver comprises a memory for storing a personal channel of a user and an apparatus for managing the personal channel according to the first aspect of the invention and the apparatus is additionally configured to provide the electronic suggestion signal to the user via the display.

The video system can be a stationary video system, such a TV set, a set top box, a personal computer, a video game console or a mobile video system, such as a mobile to phone, a personal digital assistant or a notebook.

Generally, the video system of the same aspect of the invention has the same or similar advantages as the apparatus of the first aspect of the present invention. In particular, the video system allows a user to easily manage one or more personal channels containing personally chosen linear and non-linear content items. Therefore, the user can quickly consume a content item of interest without having to put much effort into finding it, in particular without having to spend time zapping through the vast amount of available content items.

According to a third aspect of the present invention, a method for managing a personal channel of a user containing a number of personal channel data pieces, each of the number of personal channel data pieces specifying at least one content item type, is presented. The method comprises steps of:

receiving information data pieces provided by a content item information source, wherein each of the information data pieces specifies a content item,
determining for each personal channel data piece a popularity value in dependence of a number of the information data pieces that are associable to the at least one content item type of a respective personal channel data piece,
assigning a respective determined popularity value to each of the personal channel data pieces of the personal channel,
comparing the determined popularity values of the personal channel data pieces with a fixed level,
identifying such a personal channel data piece, whose assigned popularity value is below the fixed level,
generating an electronic suggestion signal in dependence of the identified personal channel data piece and
causing providing of the electronic suggestion signal to the user, the electronic suggestion signal indicating to the user to exclude the identified personal channel data piece from his personal channel.

In particular, the method of the third aspect of the invention constitutes an operating method of the apparatus of the first aspect of the invention for managing a personal channel of a user containing a number of personal channel data pieces.

Principally, the method of the third aspect of the invention shares the advantages of the apparatus of the first aspect of the present invention. In particular, the operating method has preferred embodiments that correspond to embodiments of the apparatus described above.

According to a fourth aspect of the present invention, a computer program is presented, which has executable code that, when being executed on a computer, causes the computer to perform the steps of the managing method of the third aspect of the present invention.

According to a fifth aspect of the present invention, a computer-readable medium is presented, which has computer-readable code means embodied thereon, said computer-readable program code means being operative to cause a programmable system when executing said computer-readable code means to perform the managing method of the third aspect of the present invention.

BRIEF DESCRIPTION OF THE DRAWINGS

The invention will now be described, by way of example, based on the embodiments with reference to the accompanying drawings, wherein:

FIG. 2 shows a schematic block diagram of an embodiment of the video system according to the second aspect of the invention and FIG. 3 shows a flow chart for illustrating an embodiment of the method of the third aspect of the invention.

DESCRIPTION OF EMBODIMENTS

Figure 1:
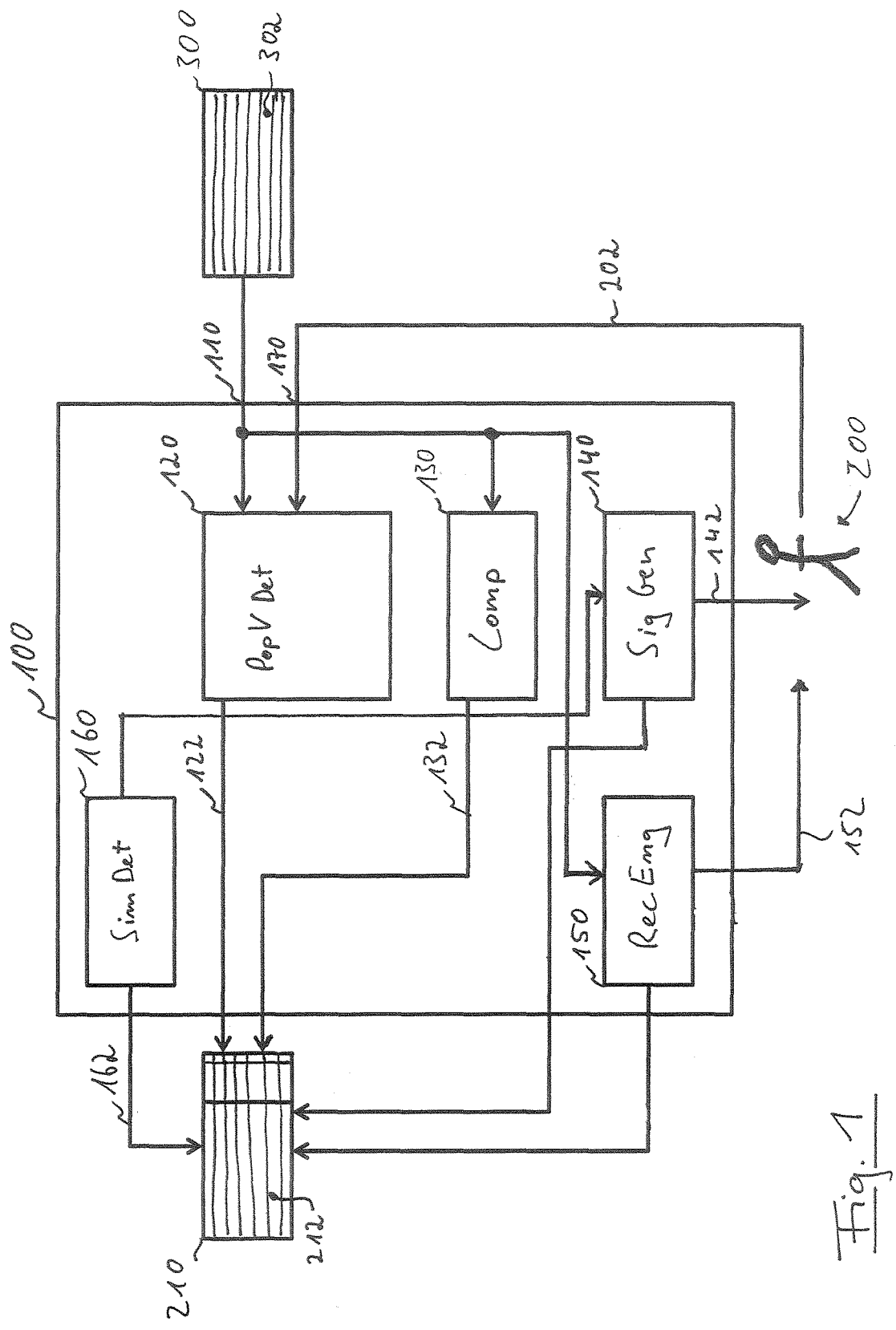
FIG. 1 shows a schematic block diagram of an embodiment of the apparatus according to the first aspect of the invention.

FIG. 1 shows a schematic block diagram of an embodiment 100 of the apparatus according to the first aspect of the invention. The apparatus 100 automatically assists a user 200 in managing his personal channel 210. The apparatus 100 has means for generating an electronic suggestion signal and providing generated electronic suggestion signal 142 to the user 200, wherein that electronic suggestion signal 142 indicates to the user to exclude one or more identified personal channel data pieces 212 from his personal channel 210. Thereby, the user 200 can easily avoid that his personal channel 210 is inconsistent with his taste and/or too large in terms of the personal channel data pieces contained in the personal channel 210. The apparatus 100 thus automatically assists the user 200 to have a clearly arranged personal channel 210 that continuously reflects the current taste/preferences of the user 200.

The apparatus 100 comprises a popularity value determiner 120 coupled to an input 110 for receiving information data pieces provided by a content item information source 300, wherein each of the information data pieces specifies a content item. The popularity value determiner 120 determines for each personal channel data piece contained in the personal channel 210 a popularity value and assigns a respective determined popularity value 122 to each of the personal channel data pieces. The popularity value determiner calculates a respective popularity value by checking, how many of the provided information data pieces 302 are associable to the at least one content item type for respective personal channel data piece. The more information data pieces, that is to say: the more content items are associable to a respective personal channel data piece, that is to say: to the at least one content item type, the higher the popularity value for that respective personal channel data piece. Correspondingly, if the number of information data pieces that is associable to another personal data piece is comparatively low, the assigned popularity value of that other personal channel data piece is low as well.

The apparatus 100 furthermore comprises a comparator 130 which has an access to the personal channel 210 and to the assigned popularity values. The comparator 130 compares the determined popularity values of the personal channel data pieces with a fixed level and identifies such a personal channel data piece, whose assigned popularity value is below the fixed level. The fixed level can be user defined. The comparator can also identify such a personal channel data piece, whose assigned popularity value is the lowest, or the second lowest or the third lowest popularity value. To mark the identified to personal channel data pieces, the comparator 130 may set an identification flag 132 to the identified personal channel data pieces.

A signal generator 140 of the apparatus 100 generates the electronic suggestion signal 142 in dependence of the identified personal channel data piece and causes providing of the electronic suggestion signal 142 to the user. The signal generator 140 generates the electronic suggestion signal 142 such that the user is informed about the personal channel data piece that is suggested for exclusion from the personal channel 210. The signal generator 140 can also generate the electronic suggestion signal 142 such that it comprises a short explanation, why the identified personal channel data piece 212 is suggested to be excluded from the personal channel 210.

Upon receiving the electronic suggestion signal 142, the user 200 can himself decide on how to further proceed. For instance, he can delete the identified personal channel data piece from his personal channel.

The apparatus 100 additionally comprises a recommender engine 150 which is coupled to the input 110 and is generally configured to cause providing of an electronic recommendation signal 152 to the user 200, wherein the electronic recommendation signal 152 identifies a new content item that might be of interest to the user 200. The user 200 can then decide, whether, for instance, he wants to consume that recommended new content item or if he wants to adapt his personal channel 210 correspondingly. The recommender engine 150 is generally configured to aid a recording scheduler (not shown) to enable automatic recording of the most liked content items for each of the personal channels. Also in the current context, the recommendation is not primarily intended for the user 200, but rather for the determination of which personal channel data piece is least popular.

The recommender engine 150 assigns a number of respective score values to those information data pieces 302, which match to the personal channel 210, such that each of the matching information data pieces 302 is assigned with a set of score values, wherein each of the set of score values is associated to one of the personal channel data pieces. Thus, the recommender engine 150 evaluates new content items in respect to the personal channel 210 and generates the electronic recommendation signal 152 in dependence of that evaluation.

The apparatus 100 for managing the personal channel 210 collaborates with the recommender engine 150 in that respect that the popularity value determiner 120 is coupled to to the recommender engine 150 and determines the popularity values for each of the personal data channel pieces in dependence of the score values being associated to the respective personal channel data piece. Therefore, the popularity value determiner can access already existent score values provided by the recommender engine 150 and does not need to perform complex calculations for checking, which information data pieces are associable to a respective personal channel data piece. As a result, the comparator 130 identifies such a personal channel data piece, which has caused mainly low score values, that is to say: such a personal channel data piece which has not been significantly relevant for a potential recommendation.

The apparatus 100 also comprises a similarity determiner 160 which detects at least two of the personal channel data pieces of the personal channel 210 that are similar to each other. The signal generator 140 generates the electronic suggestion signal 142 such that the electronic suggestion signal 142 not only names the identified personal channel data piece, but also one or more similar personal channel data pieces, if existent. The user 200 can thus decide whether or not he wants to exclude a plurality of personal channel data pieces from his personal channel 210.

The apparatus 100 furthermore comprises a second input 170 for receiving a user trigger signal 202, wherein the apparatus 100 starts operating upon receiving the user trigger signal 202. Therefore, if the user 200 has the feeling that his personal channel 210 does not reflect his current preferences anymore and/or is currently too large in terms of the amount of personal channel data pieces being existent in the personal channel 210, the user 200 can initiate operation of the apparatus 100 and thus be confronted with the electronic suggestion signal 142 a few seconds later.

The apparatus 100 is usually installed in a receiver 410 of a video system 400 schematically shown in FIG. 2. The video system 400 comprises a receiver 410 and a display 420 for displaying a received (512) linear content item 510 provided by a broadcasting station 500 and/or a received (612) non-linear content item 610 provided by a computer implemented network 600. The receiver 410 has a memory 412 for storing the personal channel 210 of the user 200. The apparatus 100 for managing that personal channel 210 provides the electronic suggestion signal 142 via the display 420 to the user 200.

The video system 400 can be a mobile video system, such as a mobile phone, a personal digital assistant, or a stationary video system, such as a part of a home cinema, part of a to personal video recording system, a set top box, a personal computer.

FIG. 3 shows a flowchart for schematically illustrating an embodiment 700 of the method according to a third aspect of the present invention. The method 700 serves for managing a personal channel of a user containing a number of personal channel data pieces, each of the number of personal channel data pieces specifying at least one content item type, and comprises the following steps:

In a first step 710, information data pieces provided by a content item information source are received, wherein each of the information data pieces specifies a content item.

In a second step 720, for each personal channel data piece a popularity value is determined in dependence of a number of the information data pieces that are associable to the at least one content item type of a respective personal channel data piece.

In a third step 730, a respective determined popularity value is assigned to each of the personal channel data pieces of the personal channel.

In a forth step 740, the determined popularity values of the personal channel data pieces are compared with a fixed level.

In a fifth step 750, such a personal channel data piece is identified, whose assigned popularity value is below the fixed level.

In a sixth step 760, an electronic suggestion signal is generated in dependence of the identified personal channel data piece.

In a seventh step 770, providing of the electronic suggestion signal to the user is caused, the electronic suggestion signal indicating to the user to exclude the identified personal channel data piece from his personal channel.

In summary, the present invention relates to an apparatus, a video system, a method and a corresponding computer program and a computer readable medium for managing a personal channel of a user. The apparatus is configured to identify a personal channel data piece that specifies a content item that the user of the personal channel might not like anymore. The apparatus then suggests to the user to delete the corresponding identified personal channel data piece and thus assists the user in keeping a clear personal to channel.

The present invention can in particular be applied to any recommender system for set-top boxes, TV sets, mobile phones, personal digital assistants (PDAs), personal computers (PCs), personal video recorders (PVRs), audio systems (including portable audio), Internet services (including audio and video services), and all devices where a personal channel can be employed. The invention is thus not restricted to recommenders for television or film content, but can be applied to music, theatre shows, books and all types of products and services for which metadata is available.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfil at least the functions of FIGS. 1 and 2 based on corresponding software routines.

The computer program may be stored/distributed on a suitable medium, such as an optical storage medium or a solid-state medium supplied together with or as part of other hardware, but may also be distributed in other forms, such as via the Internet or other wired or wireless telecommunication systems.

The mere fact that certain measures are recited in mutually different dependent claims does not indicate that a combination of these measures cannot be used to advantage. Any reference signs in the claims should not be construed as limiting the scope thereof.

It shall furthermore be understood that the drawings are schematic drawings primary for elucidating the functional behaviour between components of the depicted apparatus. The to drawings shall not be construed as specifying in a clear manner, of how hardware architecture actually has to be set-up and in particular not be construed as specifying geometric dimensions of components. To give an example, the display depicted in FIG. 1 certainly does not have to be larger in width than a user.

The invention claimed is:

1. An apparatus for automatically assisting a user to clean up a grown personal channel of the user containing a number of personal channel data pieces, each of the personal channel data pieces specifying at least one content item type, the apparatus comprising:
   an input for receiving information data pieces provided by a content item information source, wherein each of the information data pieces specifies a content item,
   a popularity value determiner coupled to the input and the personal channel and configured
      to determine for each personal channel data piece a popularity value in dependence of a number of the information data pieces that are associable to the at least one content item type of a respective personal channel data piece and
      to assign a respective determined popularity value to each of the personal channel data pieces of the personal channel,
   a comparator configured to compare the determined popularity values of the personal channel data pieces with a fixed level and identify such a personal channel data piece, whose assigned popularity value is below the fixed level and
   a signal generator configured to generate an electronic suggestion signal in dependence of the identified personal channel data piece and to cause providing of the electronic suggestion signal to the user via a display so that the user is informed about the identified personal channel data piece, the electronic suggestion signal indicating to the user that the identified personal channel data piece is suggested for exclusion from the personal channel as an option to reduce the number of personal channel data pieces of the personal channel to clean up the personal channel.

2. The apparatus according to claim 1, wherein the popularity value determiner is configured to determine the popularity values of the personal channel data pieces by further registering, for each of the number of channel data pieces, a number and/or duration of user accesses to content items that are associable to a respective channel data piece of the personal channel.

3. The apparatus according to claim 1, wherein the popularity value determiner is configured to determine the popularity values of the personal channel data pieces by calculating for each personal channel data piece a ratio of the number of the information data pieces that are associable to the at least one content item type of a respective personal channel data piece and the number of the provided information data pieces.

4. The apparatus according to claim 1, additionally comprising a recommender engine coupled to the input and configured to assign a number of respective score values to each of the information data pieces in dependence of each personal channel data piece of the personal channel, such that each of the information data pieces is assigned with a set of score values, wherein each of the set of score values is associated to one of the personal channel data pieces and wherein
   the popularity value determiner is coupled to the recommender engine and configured to determine the popularity values for each of the personal channel data pieces in dependence of the score values being associated to a respective personal channel data piece.

5. The apparatus according to claim 1, additionally comprising a similarity determiner configured to detect at least two of the personal channel data pieces being similar to each other, wherein
the signal generator is configured to generate the electronic suggestion signal to the user, such that the electronic suggestion signal indicates to the user to exclude the identified personal channel data piece or a detected similar personal channel data piece being similar to the identified personal channel data piece from his personal channel.

6. The apparatus according to claim 1, wherein
each of the personal channel data pieces is present in the form of a logical AND-conjunction of a plurality of logical conditions and
the popularity value determiner is configured to determine the popularity value for a respective personal channel data piece in dependence of a number of information data pieces that meet the logical AND-conjunction of the respective personal channel data piece.

7. The apparatus according to claim 1, additionally comprising:
a second input for receiving a user trigger signal, wherein upon receiving the user trigger signal, the generation and providing of the electronic suggestion signal to the user is initiated.

8. A video system comprising a receiver and a display, the receiver being configured to receive a linear content item provided by a broadcasting station and/or to receive a non-linear content item provided by a computer implemented network and the display being configured to display the received linear content item and/or the received non-linear content item, wherein
the receiver comprises:
a memory for storing a personal channel of a user and
an apparatus for automatically assisting a user to clean up a grown personal channel of the user containing a number of personal channel data pieces, each of the personal channel data pieces specifying at least one content item type by suggesting an option for reducing the number of personal channel data pieces of the personal channel comprising:
an input for receiving information data pieces provided by a content item information source, wherein each of the information data pieces specifies a content item,
a popularity value determiner coupled to the input and the personal channel and configured
to determine for each personal channel data piece a popularity value in dependence of a number of the information data pieces that are associable to the at least one content item type of a respective personal channel data piece and
to assign a respective determined popularity value to each of the personal channel data pieces of the personal channel,
a comparator configured to compare the determined popularity values of the personal channel data pieces with a fixed level and identify such a personal channel data piece, whose assigned popularity value is below the fixed level and
a signal generator configured to generate an electronic suggestion signal in dependence of the identified personal channel data piece and to cause providing of the electronic suggestion signal to the user via a display so that the user is informed about the identified personal channel data piece, the electronic suggestion signal indicating to the user that the identified personal channel data piece is suggested for exclusion from the personal channel as an option to reduce the number of personal channel data pieces of the personal channel to clean up the personal channel;
wherein the apparatus is additionally configured to provide the electronic suggestion signal to the user via the display.

9. A method for automatically assisting a user to clean up a grown personal channel of the user containing a number of personal channel data pieces, each of the number of personal channel data pieces specifying at least one content item type, the method comprising:
receiving information data pieces provided by a content item information source, wherein each of the information data pieces specifies a content item,
determining for each personal channel data piece a popularity value in dependence of a number of the information data pieces that are associable to the at least one content item type of a respective personal channel data piece,
assigning a respective determined popularity value to each of the personal channel data pieces of the personal channel,
comparing the determined popularity values of the personal channel data pieces with a fixed level,
identifying such a personal channel data piece, whose assigned popularity value is below the fixed level,
generating an electronic suggestion signal in dependence of the identified personal channel data piece, and
causing providing of the electronic suggestion signal to the user via a display so that the user is informed about the identified personal channel data piece, the electronic suggestion signal indicating to the user that the identified personal channel data piece is suggested for exclusion from the personal channel as an option to reduce the number of personal channel data pieces of the personal channel to clean up the personal channel.

10. A non-transitory memory including a computer program having executable code that, when being executed on a computer, causes the computer to perform the method of claim 9.

* * * * *